US011634895B2

(12) United States Patent
Malipeddi et al.

(10) Patent No.: US 11,634,895 B2
(45) Date of Patent: Apr. 25, 2023

(54) DYNAMICALLY RE-CONFIGURABLE IN-FIELD SELF-TEST CAPABILITY FOR AUTOMOTIVE SYSTEMS

(71) Applicant: QUALCOMM Incorporated, San Diego, CA (US)

(72) Inventors: Kiran Kumar Malipeddi, San Diego, CA (US); Rahul Gulati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/161,731

(22) Filed: Jan. 29, 2021

(65) Prior Publication Data
US 2022/0243437 A1 Aug. 4, 2022

(51) Int. Cl.
*E03C 1/046* (2006.01)
(52) U.S. Cl.
CPC .................. *E03C 1/0465* (2013.01)
(58) Field of Classification Search
CPC .................................... E03C 1/0465
USPC ............................ 4/668; 236/12.1
See application file for complete search history.

(56) References Cited

U.S. PATENT DOCUMENTS

| 2005/0146776 A1* | 7/2005 | Kanbe | G02F 1/167 |
| | | | 359/296 |
| 2018/0231609 A1* | 8/2018 | Jain | G06F 11/36 |
| 2019/0171538 A1* | 6/2019 | Gulati | G01R 31/317 |

OTHER PUBLICATIONS

International Search Report and Written Opinion—PCT/US2021/061935—ISA/EPO—dated Apr. 4, 2022. 24 pages.
Shibahara S: "Functional Safety SoC for Autonomous Driving", 2018 IEEE Custom Integrated Circuits Conference (CICC), IEEE, Apr. 8, 2018 (Apr. 8, 2018), pp. 1-8, XP033339170, DOI: 10.1109/CICC.2018.8357065 [retrieved on May 9, 2018] abstract paragraphs [000I], [OOII], [OIII], [III.A], [OOOIV], [OOOV] figures 2, 3, 4, 5, 13, 14.

* cited by examiner

*Primary Examiner* — Lori L Baker
(74) *Attorney, Agent, or Firm* — The Marbury Law Group/Qualcomm

(57) ABSTRACT

Various embodiments include components (e.g., a processor in a vehicle advanced driver assistance system) configured to identify subsystems that require testing in order to verify their compliance with a safety requirement. The components may determine whether verification of compliance requires that the subsystems be tested at PON, at POFF, during runtime or a combination thereof, dynamically determine the achievable parallelism for testing the identified subsystems, dynamically determine coverage level requirements for performing or executing built in self tests (BISTs) on each identified subsystem, and perform or execute the BISTs on the subsystems at the determined level of parallel and at the determined coverage level.

8 Claims, 9 Drawing Sheets

DYNAMICALLY RE-CONFIGURABLE IN-FIELD SELF-TEST CAPABILITY FOR AUTOMOTIVE SYSTEMS

BACKGROUND

Over the past several years, the modern automobile has transformed from a self-propelled mechanical vehicle into a powerful and complex electro-mechanical system that includes a large number of processors, sensors, and systems-on-chips (SOCs) that control many of the vehicle's functions, features, and operations. More recently, manufacturers have begun equipping automobiles with Safety Critical Automated Driving Systems (SCADS) and Advanced Driver Assistance Systems (ADASs) that automate, adapt, or enhance the vehicle's operations. For example, an ADAS may be configured to use information collected from the automobile's sensors (e.g., accelerometer, radar, lidar, geo-spatial positioning, etc.) to automatically detect a potential road hazard, and assume control over all or a portion of the vehicle's operations (e.g., braking, steering, etc.) to avoid detected hazards. Features and functions commonly associated with an ADAS include adaptive cruise control, automated lane detection, lane departure warning, automated steering, automated braking, and automated accident avoidance.

Due to the speed at which automobiles travel, and the significant risk automobiles pose to passenger and pedestrian lives, today's automobiles are increasingly dependent on safety standards and risk classification schemes. One such standard is defined in International Organization for Standardization (ISO) 26262 Functional Safety For Road Vehicles (herein ISO 26262), which includes an Automotive Safety Integrity Level (ASIL) risk classification scheme that defines various safety requirements. A vehicle function or system may be classified in one of four progressively more stringent ASIL levels: ASIL A, ASIL B, ASIL C, and ASIL D. ASIL A includes the lowest or least stringent integrity requirements, and ASIL D includes the highest or most stringent integrity requirements.

SUMMARY

The various aspects include methods of in-field testing electronic components included in a vehicle, which may include receiving in a dedicated local supervisor safety manager component of a primary boot processor a list of subsystems that are associated with a safety critical automotive application of the vehicle, determining by the dedicated local supervisor safety manager component for each subsystem in the list of subsystems whether verification of compliance with a safety requirement requires that the subsystem be tested at power-on (PON), at power-off (POFF), or during runtime, dynamically determining by the dedicated local supervisor safety manager component for each subsystem in the list of subsystems a coverage level required for performing a built in self test (BIST) on that subsystem, and performing BISTs on the subsystems at the determined coverage level.

Some aspects may include dynamically determining by the dedicated local supervisor safety manager component a level of parallelism for each subsystem in the list of subsystems, in which performing BISTs on the subsystems at the determined coverage level comprises performing BISTs on the subsystems at the determined level of parallelism and at the determined coverage level. In some aspects, receiving the list of subsystems that are associated with the safety critical automotive application of the vehicle may include receiving the list of subsystems from a processor external to the primary boot processor. In some aspects, receiving the list of subsystems from the processor external to the primary boot processor may include receiving the list of subsystems from an Automotive Safety Integrity Level D (ASIL-D) processor that is external to the primary boot processor.

In some aspects, receiving the list of subsystems that are associated with the safety critical automotive application of the vehicle may include receiving the list of subsystems from a processor included in the primary boot processor. In some aspects, receiving the list of subsystems from the processor included within the primary boot processor may include receiving the list of subsystems from an Automotive Safety Integrity Level D (ASIL-D) processor that is included in the primary boot processor.

Some aspects may include determining whether to perform a BIST on a session manager subsystem (SMSS) based on a Boot_Config pin. Some aspects may include determining whether to perform a BIST on a safety manager subsystem (SMSS) at PON or POFF based on values on two general-purpose input/output (GPIO) components.

Further aspects may include a computing device configured to perform operations of the methods discussed above. Further aspects may include a computing device having various means for performing the functions of the methods discussed above. Further aspects may include a computing device having various means for performing the functions of the methods discussed above. Further aspects may include a non-transitory computer readable storage medium having stored thereon processor-executable software instructions configured to cause a processor to perform operations of the methods discussed above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
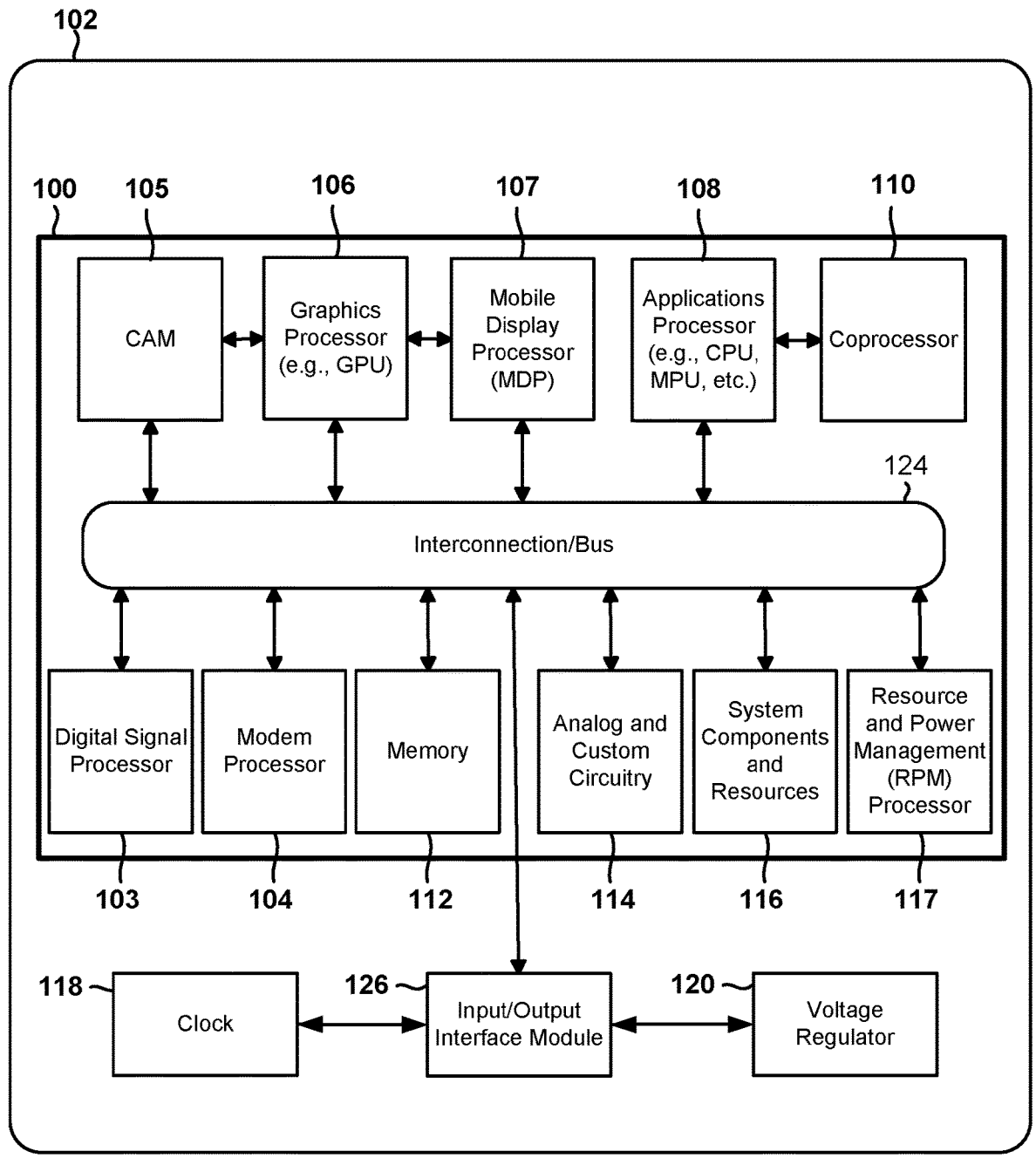
FIG. 1 is a block diagram illustrating components of an example system on chip that may be included in a computing device and configured in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include ultra-fast, safe, and secure components (e.g., processors, systems on chip, etc.) that are configured to perform in-field self tests to determine whether the components are operating correctly, as expected, or in compliance with relevant safety standards. In some embodiments, a component (e.g., a processor in a vehicle's advanced driver assistance system, etc.) may be configured to identify subsystems that require testing to verify compliance with a safety requirement. Such a components may determine whether verification of compliance requires that the identified subsystems be tested at power-on (PON), at power-off (POFF), during runtime or a combination thereof. The components may then dynamically determine the achievable parallelism for testing the identified subsystems, dynamically determine coverage level requirements (e.g., 60%, 80%, 90%, etc.) for performing or executing built in self tests (BISTs) on each identified subsystem, and perform or execute the BISTs on the identified subsystems in parallel and at the determined coverage level.

Various embodiments overcome many of the limitations of conventional solutions for monitoring system components. As such, various embodiments may improve the safety and reliability of safety-critical systems and subsystems. Accordingly, various embodiments may be implemented in current and future automotive applications responsible for controlling or automating the vehicle's operation, such as the system on chips (SOCs) that include or implement a vehicle's advanced driver assistance system (ADAS), and thus improve the safety and reliability of vehicles.

The terms "component," "module," "system," and the like may be used herein to refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core.

The term "built-in self-test" (BIST) is used herein to refer to hardware and/or software that permits a component (e.g., an SOC, SIP etc.) to test itself, thereby decreasing the component or system's reliance upon external test equipment. A component's BIST capabilities may include "in-field" logic built-in self-test (LBIST) and/or memory built-in self-test (MBIST). A component equipped with such BIST capabilities may detect permanent faults and perform field-tests at power-on (PON), power-off (POFF), periodically during operation, on-demand, and/or at user-programmable intervals. Such "field tests" may allow the component to evaluate itself and determine whether its various sub components (e.g., circuits, processors, cores, memories, software, firmware, etc.) are operating correctly or as expected.

The term "safety element out of context" (SEooC) is used herein to refer to a vehicle's computerized components that are not developed specifically for that vehicle or by an original equipment manufacturer, supplier or technology vendor. Rather, SEooC components are designed and configured based on assumptions or "assumed use cases" that anticipate how the component will be used in or by a vehicle. It is important to verify that SEooC components comply with integrity requirements (e.g., ASIL-D, etc.). Some automotive safety standards may define a different set of testing and safety requirements for SEooC components than non-SEooC components.

The phrase "safety critical automotive applications" is used herein to refer to functions that are important to the safe operation of a vehicle. Examples of safety critical automotive applications may include Society of Automotive Engineers (SAE) L1-L5 automated driving systems, advanced driver assistance systems (ADAS), instrument cluster, invehicle infotainment (IVI), display systems, surround view systems, airbag systems, braking systems, power steering systems, electronic throttle control systems, and the like. Safety critical automotive applications may involve the use of centralized processing units (CPUs), digital signal processor s (DSPs), network processing units (NPUs), neural network signal processors (NSPs), dedicated hardware accelerators, SoC infrastructure cores, etc., any or all of which may be SEooC components.

Components associated with safety critical automotive applications may be equipped with built-in self-test (BIST) capabilities for self-evaluating and self-determining whether that component is operating correctly, as expected, and/or in compliance with the various safety standard and/or risk classification schemes. However, using conventional solutions, there are a number of configurability and parallelism challenges associated with using a component's BIST capabilities to ensure compliance with key functional safety requirements. These challenges may become multi-fold when supporting the structural field tests across boot key performance indicators (KPIs), across original equipment manufacturers (OEMs), and/or across assumed use cases for SEooC components.

For example, using conventional solutions, it is challenging to run multiple on-demand structural in-field tests on several cores concurrently or in parallel (e.g., during the boot process for optimizing boot KPIs, etc.). In addition, it is challenging to provide configurability related to performing the self-test at power-on (PON), power-off (POFF), or periodically during runtime (mission mode) for any or all of the subsystems included in an SOC or SIP. It may also be challenging to provide configurability related to subsystems that need to be tested via the BIST capabilities and/or to run additional on-demand structural in-field tests for debug or coverage enhancement for higher ASIL safety critical use cases.

Various embodiments include components (e.g., ADAS SOCs, processors, etc.) configured to overcome the above-described technical challenges and limitations of conventional solutions. The components may be configured to identify subsystems that require testing to verify their compliance with certain safety requirements, determine whether the identified subsystems should be tested on system power up or power-on (PON), on system power down or power-off (POFF), during runtime, or a combination thereof in order to verify their compliance with the safety requirements, and to perform built-in self-tests (BISTs) of the identified subsystems (e.g., at PON, POFF, runtime, etc.) to verify their compliance with the relevant safety requirements. In some embodiments, the component may be configured to provide dynamic configuration support for performing or executing the BISTs at PON, POFF and/or runtime.

Some embodiments may include a dynamically configurable hierarchical safety supervisor model. The dynamically configurable hierarchical safety supervisor model may include a local supervisor and a global supervisor, which may be configured to work in conjunction with one another to ensure the integrity of components and subsystems associated with a safety critical automotive application.

In some embodiments, the execution of built-in self-tests (BISTs) may be controlled by an external processor (e.g., ASIL D processor, etc.). The external processor may be configured to identify subsystems associated with safety critical automotive applications, generate a list of the identified subsystems, and send the list of subsystems to the component for evaluation. In response to receiving the list, the component may evaluate the subsystems included in the received list and/or cause the subsystems included in the received list to perform BISTs. In some embodiments, the list may be generated based on the various needs, such as original equipment manufacturer (OEM) Safety Requirements, Boot KPIs, PON, POFF, Safety Level, IVI or ADAS.

In some embodiments, the component may be configured to support boot time optimizations. In some embodiments, the component may be configured to dynamically determine the achievable parallelism for conducting BIST on certain subsystems included in the list of subsystems (e.g., list received from the external processor, etc.).

In some embodiments, the component may be configured to provide dynamic configuration support and/or to dynamically select coverage requirements (e.g., 60%, 80%, 90%, etc.) for performing or executing the BISTs on each subsystem.

By dynamically selecting coverage requirements, a component in accordance with some embodiments may allow OEM specific boot key performance indicator (KPI) driven coverage selection of safety critical subsystems. In addition, the dynamic selection of coverage requirements may allow the components to comply with stringent ASIL requirements (e.g., as part of car to cloud services, over the air (OTA) updates resulting in feature enhancements, etc.).

Various embodiments may be implemented and/or included in a number of single processor and multiprocessor computer systems, including a system-on-chip (SOC). FIG. 1 illustrates an example system-on-chip (SOC) 100 architecture that may be used in computing devices implementing the various embodiments. The SOC 100 may include a number of heterogeneous processors, such as a digital signal processor (DSP) 103, a modem processor 104, a graphics processor 106, a mobile display processor (MDP) 107, an applications processor 108, and a resource and power management (RPM) processor 117. The SOC 100 may also include one or more coprocessors 110 (e.g., vector co-processor) connected to one or more of the heterogeneous processors 103, 104, 106, 107, 108, 117. Each of the processors may include one or more cores, and an independent/internal clock. Each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows). In some embodiments, the applications processor 108 may be the SOC's 100 main processor, central processing unit (CPU), microprocessor unit (MPU), arithmetic logic unit (ALU), etc. The graphics processor 106 may be graphics processing unit (GPU).

The SOC 100 may include analog circuitry and custom circuitry 114 for managing sensor data, analog-to-digital conversions, wireless data transmissions, and for performing other specialized operations, such as processing encoded audio and video signals for rendering on an electronic display. The SOC 100 may further include system components and resources 116, such as voltage regulators, oscillators, phase-locked loops, peripheral bridges, data controllers, memory controllers, system controllers, access ports, timers, and other similar components used to support the processors and software clients (e.g., a web browser) running on a computing device. The SOC 100 also include specialized circuitry (CAM) 105 that includes, provides, controls, and/or manages the operations of one or more cameras (e.g. front camera, surround view camera, driver monitoring camera, rear camera and associated circuitry etc.), the video display data from camera firmware, image processing, video preprocessing, video front-end (VFE), in-line JPEG, high definition video codec, etc. The CAM 105 may be an independent processing unit and/or include an independent or internal clock.

The system components and resources 116, custom circuitry 114, and/or CAM 105 may include circuitry to interface with peripheral devices, such as cameras, electronic displays, wireless communication devices, external memory chips, etc. The processors 103, 104, 106, 107, 108 may be interconnected to one or more memory elements 112, system components, and resources 116, custom circuitry 114, CAM 105, and RPM 117 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output interface module 126 for communicating with resources external to the SOC, such as a clock 118 and a voltage regulator 120. Resources external to the SOC (e.g., a clock 118 or a voltage regulator 120) may be shared by two or more of the internal SOC processors/cores (e.g., a DSP 103, a modem processor 104, a graphics processor 106, an applications processor 108, etc.).

In some embodiments, the SOC 100 may be included in a computing device 102, which may be included in an automobile. The computing device 102 may include communication links for communications with a telephone network, the Internet, a network server, or to other electronic control units (ECUs) inside the vehicle. Communications between the computing device 102 and the network server may be achieved through the telephone network, the Internet, private network, a vehicle network, or any combination thereof.

The SOC 100 may also include additional hardware and/or software components that are suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, Global Positioning System (GPS) receivers, communications circuitry (e.g., Bluetooth®, WLAN, Wi-Fi, etc.), and other well-known components (e.g., accelerometer, etc.) of modern electronic devices.

In addition to the computing device 102 and SOC 100 discussed above, the various embodiments may be implemented in a wide variety of computing systems, which may include a single processor, multiple processors, multicore processors, or any combination thereof.

Figure 2A:
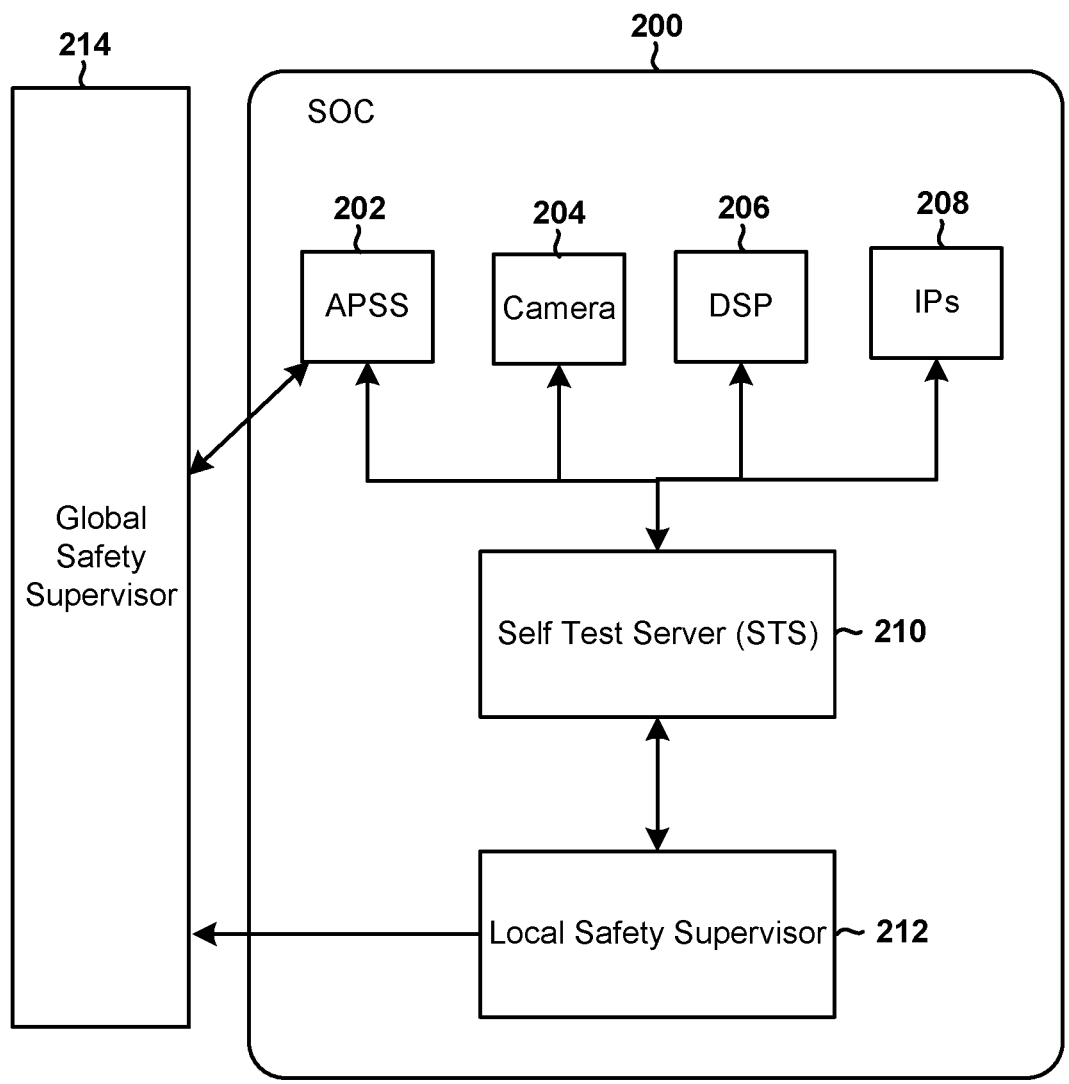
FIG. 2A is a block diagram illustrating an example processor equipped with a dedicated local supervisor safety manager suitable for performing in-field self tests in accordance with some embodiments.

FIGS. 2A-2F illustrate example components that may be included in a board, SIP, or SOC that includes or implements a dynamically configurable hierarchical safety supervisor model that could be used to verify or ensure the integrity of logic and memory of safety critical automotive applications in accordance with some embodiments. In particular, FIG. 2A illustrates a SOC/SIP 200 that includes an applications processor subsystem (APSS) 202, a camera 204, a digital signal processor (DSP) 206, various internal processor cores (IPs) 208, a self test server (STS) 210 and a local safety supervisor 212. The APSS 202 may be configured to operate as the primary boot processor. The APSS (boot processor) 202 and the local safety supervisor 212 may each be configured to communicate with the STS 210 and a global safety supervisor 214 that is outside of the SOC 200. In some embodiments (e.g., embodiments illustrated in FIGS. 2D and 2E, etc.) a Global Safety Supervisor 214 may be included on the same SoC 200.

The APSS 202 may be configured to communicate with the STS 210 to test the local safety supervisor 212. The local safety supervisor 212 may be configured to communicate with the STS 210 to test any or all of the components 202-208 on the SOC 200. The local safety supervisor 212 may be configured to send a functional safety interrupt to the global safety supervisor 214.

The local safety supervisor 212 may be a dedicated local supervisor safety manager that is configured to receive inputs from any or all of the components 202-208, 212, 214. The local safety supervisor 212 may be configured to generate an error output (ERROR), a fault output (FAULT) and/or an interrupt output (INTERRUPT) based on one or more of the inputs (e.g., CPU input, GPU input, etc.). The local safety supervisor 212 may send the generated output (or fault aggregator or any other on-board processing unit) to the Global Safety Supervisor 214 or take actions on behalf of Global Safety Supervisor 214 to initiate actions or operations, such as BIST operations, on the device during system power up, power down, and/or during runtime in the field. In some embodiments, the local safety supervisor 212 may send the generated output to the APSS 202 (e.g., via the STS 210, etc.).

In some embodiments, the local safety supervisor 212 may be configured to monitor any or all of the components and subsystems on the SOC 200.

Figure 2B:
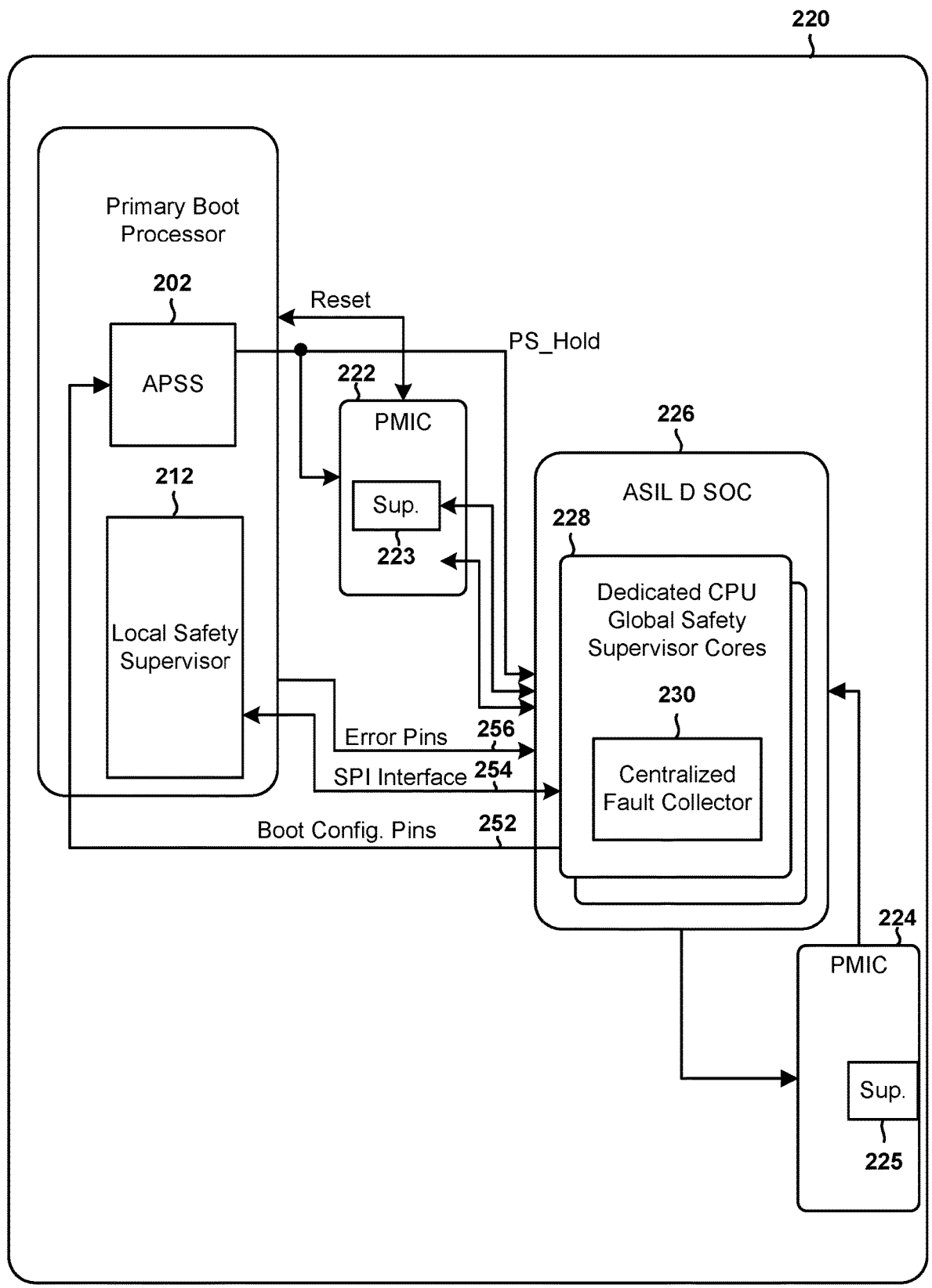
FIGS. 2B and 2C are block diagrams illustrating components that may be included in a vehicle and configured in accordance with the embodiments to self-determine whether they are operating correctly, as expected, or in compliance with relevant safety standards.
Figure 2C:
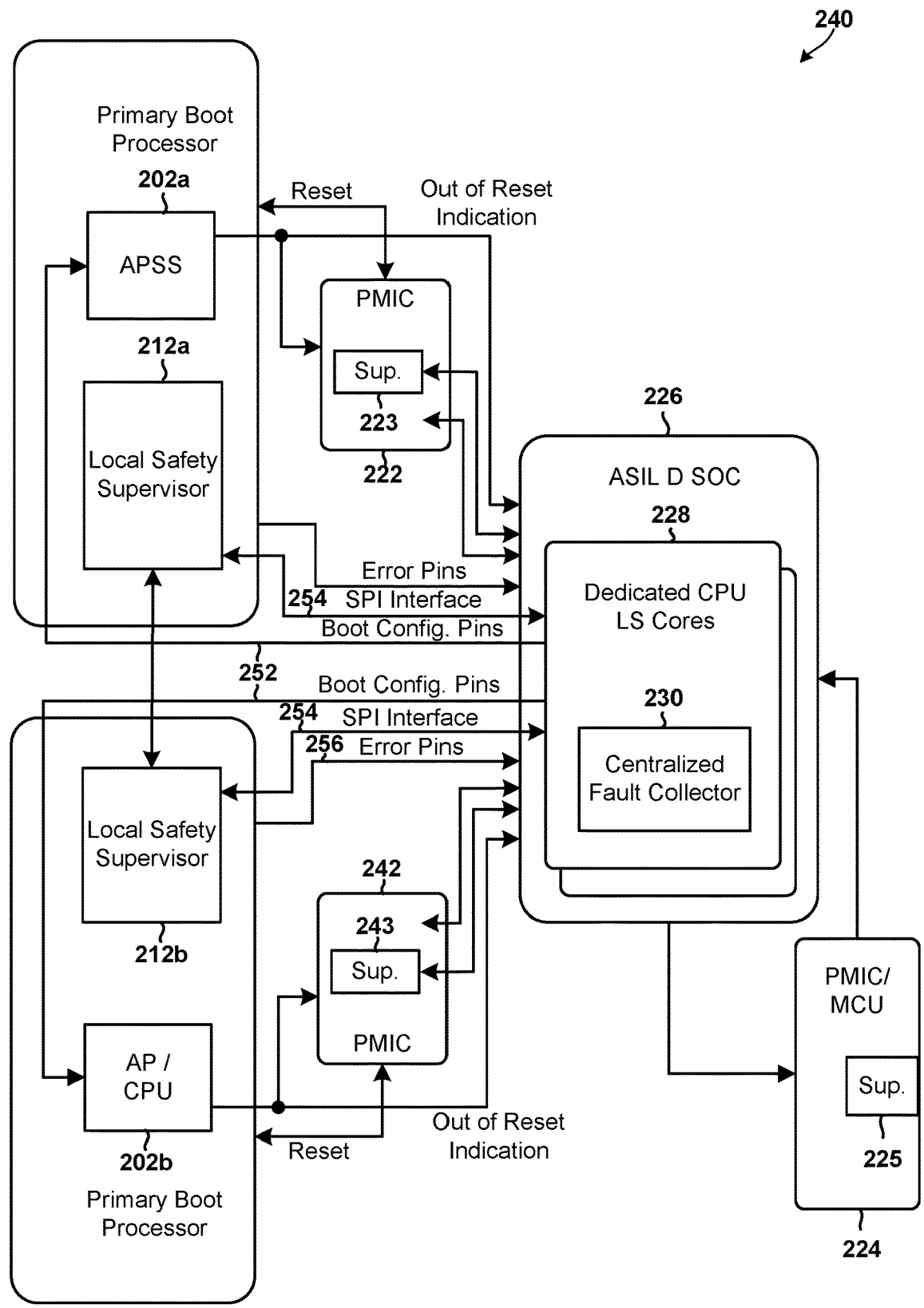
Figure 2D:
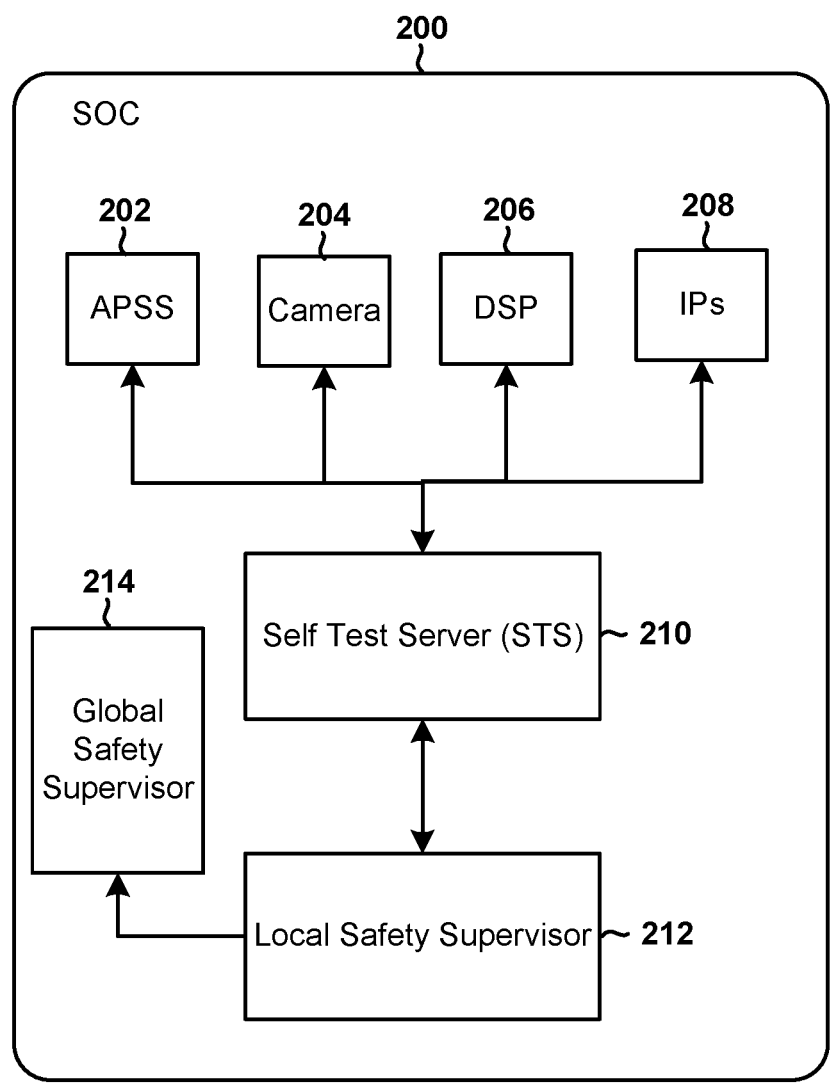
FIG. 2D is a block diagram illustrating an example processor equipped with a dedicated local supervisor safety manager suitable for performing in-field self tests included within the printed circuit board, system on chip, or system in package in accordance with some embodiments.
Figure 2E:
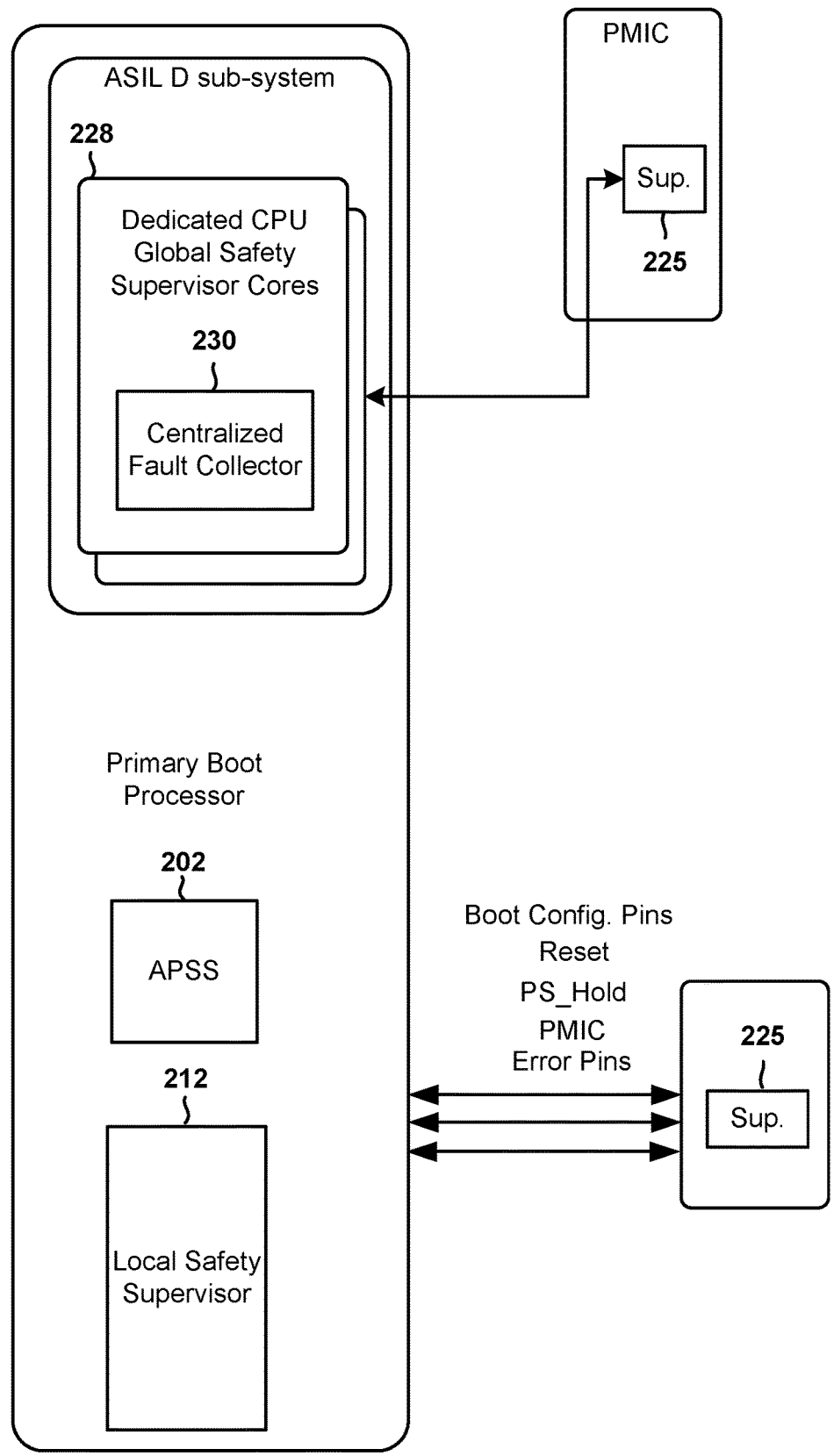
FIGS. 2E and 2F are block diagrams illustrating components that may be included in a vehicle and configured to self-determine whether they are operating correctly, as expected, or in compliance with relevant safety standards in accordance with some embodiments.
Figure 2F:
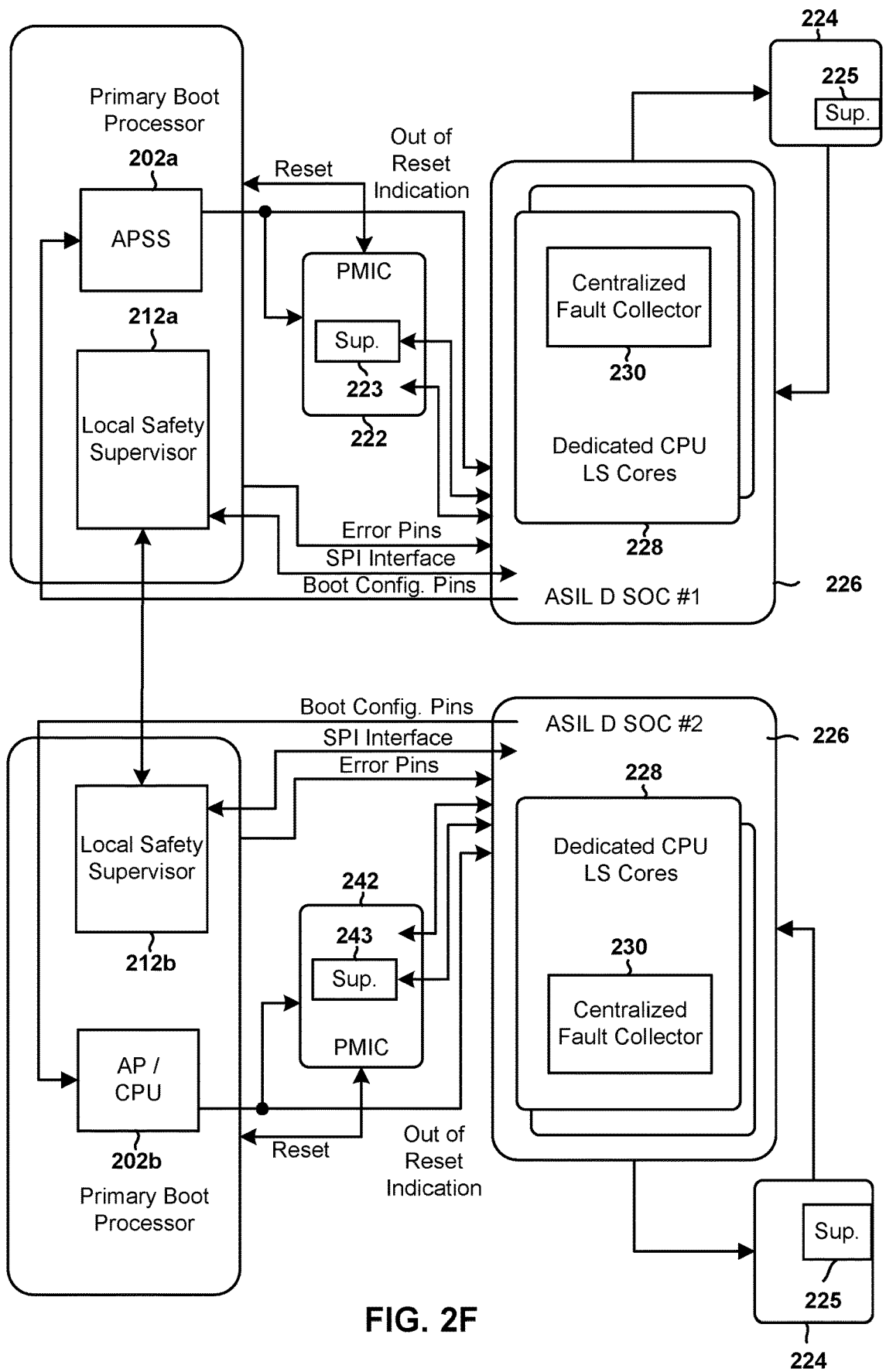

FIGS. 2B and 2C illustrate an SoC/SIP that includes a dynamically configurable hierarchical safety supervisor model suitable for use in automated driving systems, ranging from SAE Level 1 to Level 5 or equivalent automated driving systems.

In particular, FIG. 2B illustrates an SIP 220 that includes a primary boot processor in the form of an APSS 202, power management integrated circuits (PMIC) 222, 224 and an ASIL D SOC 226. Each of the PMICs 222, 224 may include a supervision (SUP) 223, 225 component. The ASIL D SOC 226 may include dedicated CPU global safety supervisor cores 228 that include a centralized fault collector 230. The local safety supervisor 212 may be configured to operate as a local supervisor, and the dedicated CPU global safety supervisor cores 228 may be configured to operate as a global supervisor.

FIG. 2C illustrates an SIP 240 that includes two primary boot processors 202a, 202b, three PMICs 222, 224, 242 that each include a supervision (SUP) 223, 225, 243 component, and an ASIL D SOC 226. In the example illustrated in FIG. 2C, the local safety supervisor 212a, 212b components may be configured to operate as local supervisors, and the dedicated CPU global safety supervisor cores 228 may be configured to operate as the global supervisor.

The local and global supervisors may operate to ensure the integrity of hardware components involved in a safety critical use case or safety critical automotive applications by causing those components to perform in-field BIST (e.g., during runtime, etc.) to verify that the hardware components are operating correctly or as expected. As such, the local and global supervisors may ensure the fulfillment of the requirements related to self-test for the logic and memory of safety critical component to detect any in-field structural faults over the life of the SOC/SIP.

The Primary Boot Processor APSS 202 may be configured to perform BIST on Local Safety Supervisor at PON or POFF based on the values of boot configuration pins 252. The Primary Boot Processor APSS 202 may assign two general-purpose input/output (GPIO) Pins to represent four different states (e.g., PON, POFF, NO BIST, Future-use). In some embodiments, the Primary Boot processor APSS 202 may be configured to perform configuration selection from a static table, with limited pre-defined choices.

The global supervisor may be configured to monitor any or all of the components and systems on the SIP, and guide the local supervisor to carry out BIST of other subsystems based on boot config pins 252 and SPI interface 254.

The local and global supervisors may be configured to work in conjunction with one another as described above via the communication interfaces to identify subsystems that require testing to verify their compliance with certain safety requirements, determine whether the identified subsystems should be tested at PON, at POFF, during runtime, or a combination thereof (e.g., in order to verify their compliance with the safety requirements), dynamically determine the achievable parallelism for the identified subsystems, dynamically determine coverage requirements (e.g., 60%, 80%, 90%, etc.) for performing or executing BISTs on each identified subsystems, and perform or execute BISTs on the identified subsystems. The Global Safety Supervisor may share configuration Information (e.g., 302-314) to Local Safety Supervisor using SPI Interface 254 or any other Communication Interfaces like UART, I2C, Ethernet, CAN, etc.

Figure 3:
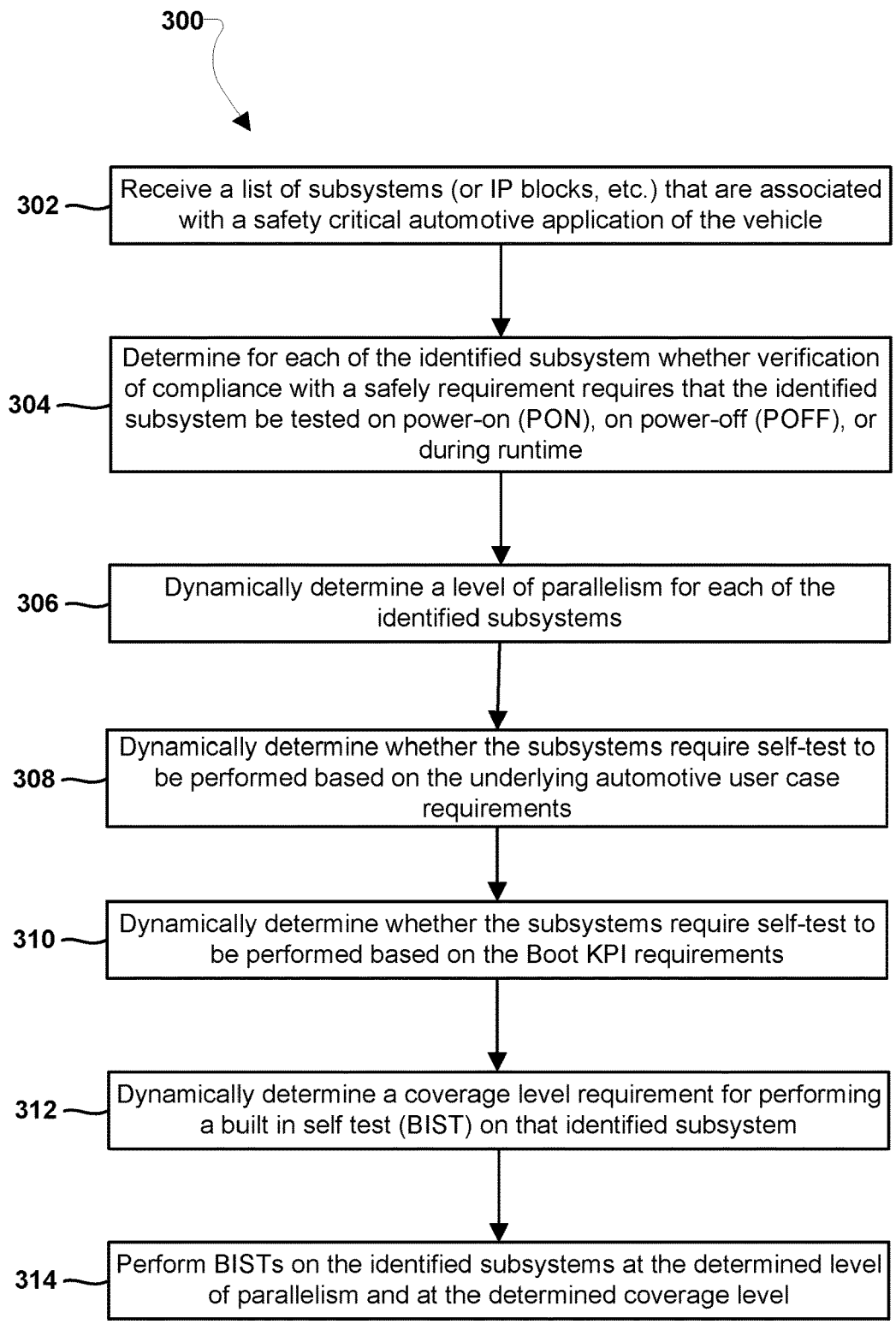
FIG. 3 is a process flow diagram illustrating a method of performing in-field testing of electronic components included in a vehicle in accordance with some embodiments.

FIG. 3 illustrates a method 300 of in-field testing electronic components included in a vehicle to determine whether they are operating correctly, as expected, or in compliance with relevant safety standards in accordance to some embodiments. All or portions of the operations in method 300 may be performed by a microcontroller (MCU), processor, processing core, or component included in a vehicle, such as the dedicated local supervisor safety manger 202 coupled to the AP/CPU 108 illustrated in FIGS. 1 and 2A-2E.

In some embodiments, after the boot processor completes LBIST and MBIST of local safety supervisor, the local safety supervisor may take control and establish a safe communication channel with a global safety supervisor. This safe communication channel could be any type of serial or parallel communication interface (e.g., SPI, I2C, UART, Ethernet, CAN, etc.). The global safety supervisor may use these safe communication channels to inform the local safety supervisor of the various possible configurations.

Referring to FIG. 3, in block 302, a component (e.g., the local safety supervisor 212) may receive a list of subsystems that are associated with a safety critical automotive application of the vehicle. In some embodiments, the component may receive the list of subsystems from an external processor, such as a dedicated CPU local supervisor cores 212 (FIG. 2B). In some embodiments, the component may receive the list of subsystems from an Automotive Safety Integrity Level D (ASIL-D) processor that is external to the primary boot processor. In some embodiments, the list may be generated based on needs or requirements, such as OEM Safety Requirements, Boot KPIs, PON, POFF, Safety Level, IVI or ADAS. In some embodiments, such as the embodiments illustrated and described with reference to FIG. 2D and FIG. 2E, the list of sub-systems to be tested may be received from an ASIL D sub-system within the same SoC.

In block 304, the component may determine, for each of the identified subsystems, whether verification of compliance with a safety requirement requires that the subsystem be tested on power-on (PON), on power-off (POFF), or during runtime. At PON, the local safety supervisor may optionally run a minimal set of test cases. For example, MBIST may run using a test pattern such as 0x0000 or 0xFFFF to write and read to verify. At POFF, the test patterns may be increased to 0xAAAA, 0x5555, 0x00FF, 0xFF00, 0xAA55, 0x55AA etc. and the test pattern list may grow.

In block 306, the component may dynamically determine a level of parallelism for permanent fault detection for each of the identified subsystems. The level of parallelism may depend upon the current drawn requirements, power delivery network (PDN) analysis, thermal scenarios that decide subsystems or peripherals or IP blocks that can run in parallel, etc. This information may be gathered by a system characterization team upfront and/or may be captured by the SoC software to support different possible combinations of cores/subsystems/IPs/peripherals. Based on end use case requirements, the SoC software may dynamically choose the cores/subsystems/IPs/peripherals that can run in parallel to ensure the system runs self-tests in the least possible time meeting the current, PDN and thermal profile.

In block 308, the component may dynamically determine whether the subsystems require self-test to be performed based on the underlying automotive use case requirements.

In block 310, the component may dynamically determine whether the subsystems require self-test to be performed based on the Boot KPI requirements.

In block 312, the component may dynamically determine a coverage level required for performing a BIST on that subsystem. In some embodiments, the component may determine whether to perform a BIST on a safety manager subsystem (SMSS) based on Boot_Config pins. The global safety supervisor may also inform the boot processor via the boot config GPIO pins to run a self-test on the local safety supervisor either at PON, POFF or never. Hence GPIO boot config pins may be used.

In block 314, the component may perform BISTs on the identified subsystems at the determined level of parallelism and at the determined coverage level. In addition, each safety use case might want to choose a different safety coverage level based on the self-test being run at PON or POFF.

Figure 4:
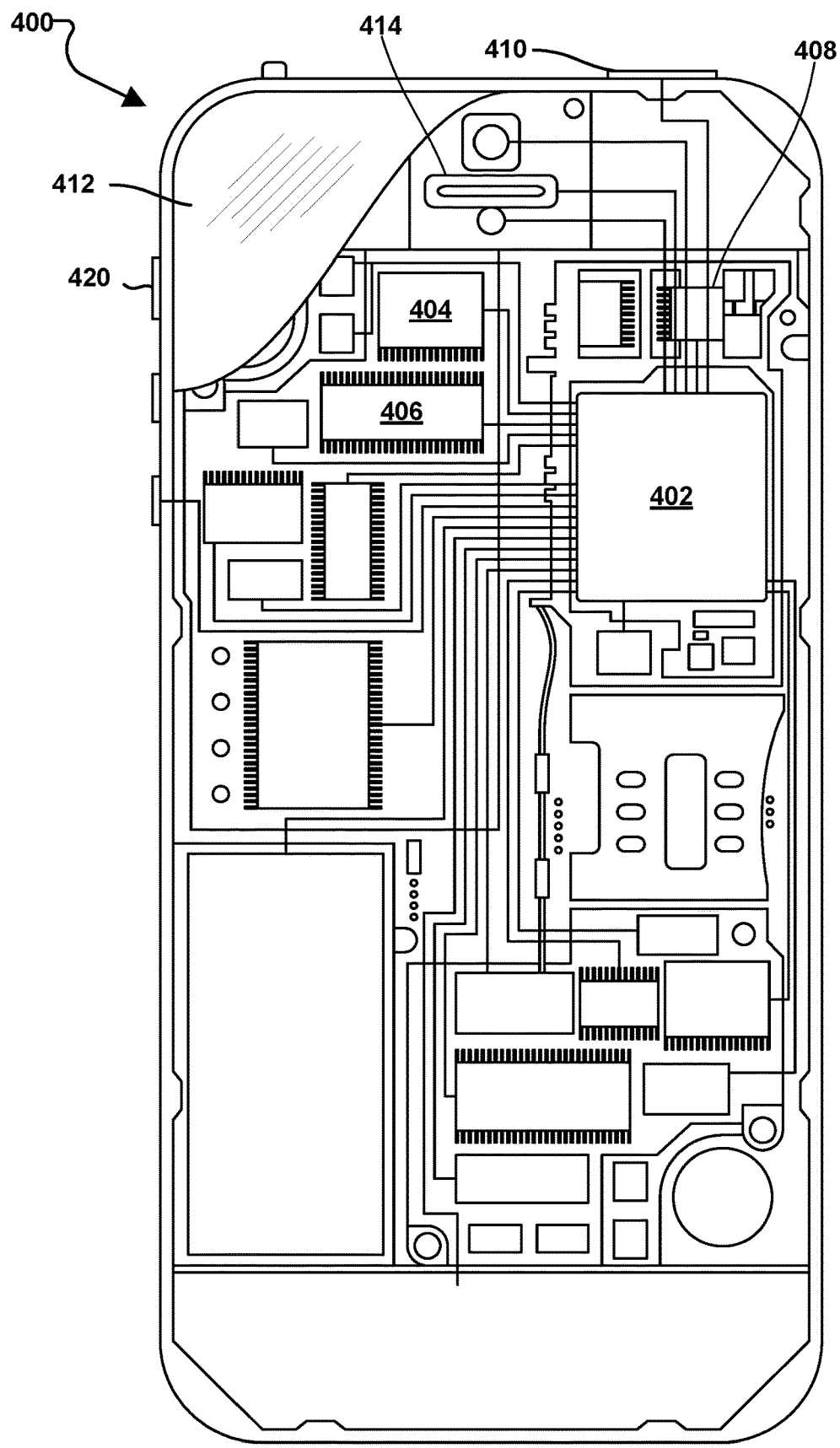
FIG. 4 is a component block diagram of an electronic component that could be included in a vehicle and configured to perform to perform self tests in accordance with some embodiments.

The various embodiments may be implemented on a variety of electronic components in a vehicle, an example of which is illustrated in FIG. 4 in the form of a vehicle display unit 400. A vehicle display unit 400 may include a processor 402 coupled to internal memory 404, a display 412, and to a speaker 414. Additionally, the vehicle display unit 400 may include an antenna 410 for sending and receiving electromagnetic radiation that may be connected to a wireless data link and/or cellular telephone transceiver 408 coupled to the processor 402. The vehicle display unit 400 may also include menu selection buttons or rocker switches 420 for receiving user inputs.

A vehicle display unit 400 could include a sound encoding/decoding (CODEC) circuit 406, which digitizes sound received from a microphone into data packets suitable for wireless transmission and decodes received sound data packets to generate analog signals that are provided to the speaker to generate sound. Also, one or more of the processor 402, wireless transceiver 408 and CODEC 406 may include a digital signal processor (DSP) circuit (not shown separately).

The processors 402 may be any programmable microprocessor, microcomputer or multiple processor chip or chips that can be configured by software instructions (applications) to perform a variety of functions, including the functions of the various embodiments described below. In some mobile devices, multiple processors 402 may be provided, such as one processor dedicated to wireless communication functions and one processor dedicated to running other applications. Typically, software applications may be stored in the internal memory 404 before they are accessed and loaded into the processor 402. The processor 402 may include internal memory sufficient to store the application software instructions.

Implementation examples are described in the following paragraphs. While some of the following implementation examples are described in terms of example methods, further example implementations may include: the example methods discussed in the following paragraphs implemented by a computing device for use in a vehicle including a primary boot processor configured with processor-executable instructions to perform operations of the methods of the following implementation examples; the example methods discussed in the following paragraphs implemented by a computing device for use in a vehicle including means for performing functions of the methods of the following implementation examples; and the example methods discussed in the following paragraphs may be implemented as a non-transitory processor-readable storage medium having stored thereon processor-executable instructions configured to cause a processor of a computing device for use in a vehicle to perform the operations of the methods of the following implementation examples.

Example 1. A method of in-field testing electronic components included in a vehicle, includes: receiving, in a dedicated local supervisor safety manager component of a primary boot processor, a list of subsystems that are associated with a safety critical automotive application of the vehicle; determining, by the dedicated local supervisor safety manager component for each subsystem in the list of subsystems, whether verification of compliance with a safety requirement requires that the subsystem be tested at PON, at POFF, or during runtime; dynamically determining, by the dedicated local supervisor safety manager component for each subsystem in the list of subsystems, a coverage level required for performing a BIST on that subsystem; and performing BISTs on the subsystems at the determined coverage level.

Example 2. The method of example 1, further including dynamically determining, by the dedicated local supervisor safety manager component, a level of parallelism for each subsystem in the list of subsystems, in which performing BISTs on the subsystems at the determined coverage level includes performing BISTs on the subsystems at the determined level of parallelism and at the determined coverage level.

Example 3. The method of either example 1 or example 2, in which receiving the list of subsystems that are associated with the safety critical automotive application of the vehicle includes receiving the list of subsystems from a processor external to the primary boot processor.

Example 4. The method of example 3, in which receiving the list of subsystems from the processor external to the primary boot processor includes receiving the list of subsystems from an ASIL-D processor that is external to the primary boot processor.

Example 5. The method of any of examples 1-4, in which receiving the list of subsystems that are associated with the safety critical automotive application of the vehicle includes receiving the list of subsystems from a processor included in the primary boot processor.

Example 6. The method of example 5, in which receiving the list of subsystems from the processor included within the primary boot processor includes receiving the list of subsystems from an ASIL-D processor that is included in the primary boot processor.

Example 7. The method of any of examples 1-6, further including determining whether to perform a BIST on an SMSS based on a Boot_Config pin.

Example 8. The method of any of examples 1-7, further including determining whether to perform a BIST on an SMSS at PON or POFF based on values on two GPIO components.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a vehicle's advanced driver assistance system (ADAS), system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

The foregoing method descriptions and the process flow diagrams are provided merely as illustrative examples, and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "comparator," "encoder," "element" "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A computing device, comprising:
a primary boot processor configured with processor-executable software instructions to:
receive a list of subsystems that are associated with a safety critical automotive application of a vehicle;
determine, for each subsystem in the received list of subsystems, whether verification of compliance with a safety requirement requires that the subsystem be tested at power-on (PON), at power-off (POFF), or during runtime;
dynamically determine, for each subsystem in the received list of subsystems, a coverage level required for performing a built in self test (BIST) on that subsystem; and
perform BISTs on the subsystems at the determined coverage level at PON, POFF or runtime to verify compliance with the safety requirement.

2. The computing device of claim 1, wherein the primary boot processor is further configured to:
dynamically determine a level of parallelism for each subsystem in the received list of subsystems; and
perform BISTs on the subsystems at the determined coverage level at PON, POFF or runtime to verify compliance with the safety requirement by performing BISTs on the subsystems at the determined level of parallelism and at the determined coverage level at PON, POFF or runtime to verify compliance with the safety requirement.

3. The computing device of claim 1, wherein the primary boot processor is configured to receive the list of subsystems that are associated with the safety critical automotive application of the vehicle by receiving the list of subsystems from a processor external to the primary boot processor.

4. The computing device of claim 3, wherein the primary boot processor is configured to receive the list of subsystems from the processor external to the primary boot processor by receiving the list of subsystems from an Automotive Safety Integrity Level D (ASIL-D) processor that is external to the primary boot processor.

5. The computing device of claim 1, wherein the primary boot processor is configured to receive the list of subsystems that are associated with the safety critical automotive application of the vehicle by receiving the list of subsystems from a processor included in the primary boot processor.

6. The computing device of claim 5, wherein the primary boot processor is configured to receive the list of subsystems from the processor included within the primary boot processor by receiving the list of subsystems from an Automotive Safety Integrity Level D (ASIL-D) processor that is included in the primary boot processor.

7. The computing device of claim 1, wherein the primary boot processor is configured to determine whether to perform a BIST on a session manager subsystem (SMSS) based on a Boot_Config pin.

8. The computing device of claim 1, wherein the primary boot processor is configured to determine whether to perform a BIST on a safety manager subsystem (SMSS) at PON or POFF based on values on two general-purpose input/output (GPIO) components.

* * * * *